Feb. 7, 1961 P. G. HUGHES 2,970,383
AIR FLOW REGULATING SYSTEM FOR CLOTHES DRYERS
Filed March 24, 1958 3 Sheets-Sheet 1

INVENTOR.
PHILIP G. HUGHES
BY
HIS ATTORNEY

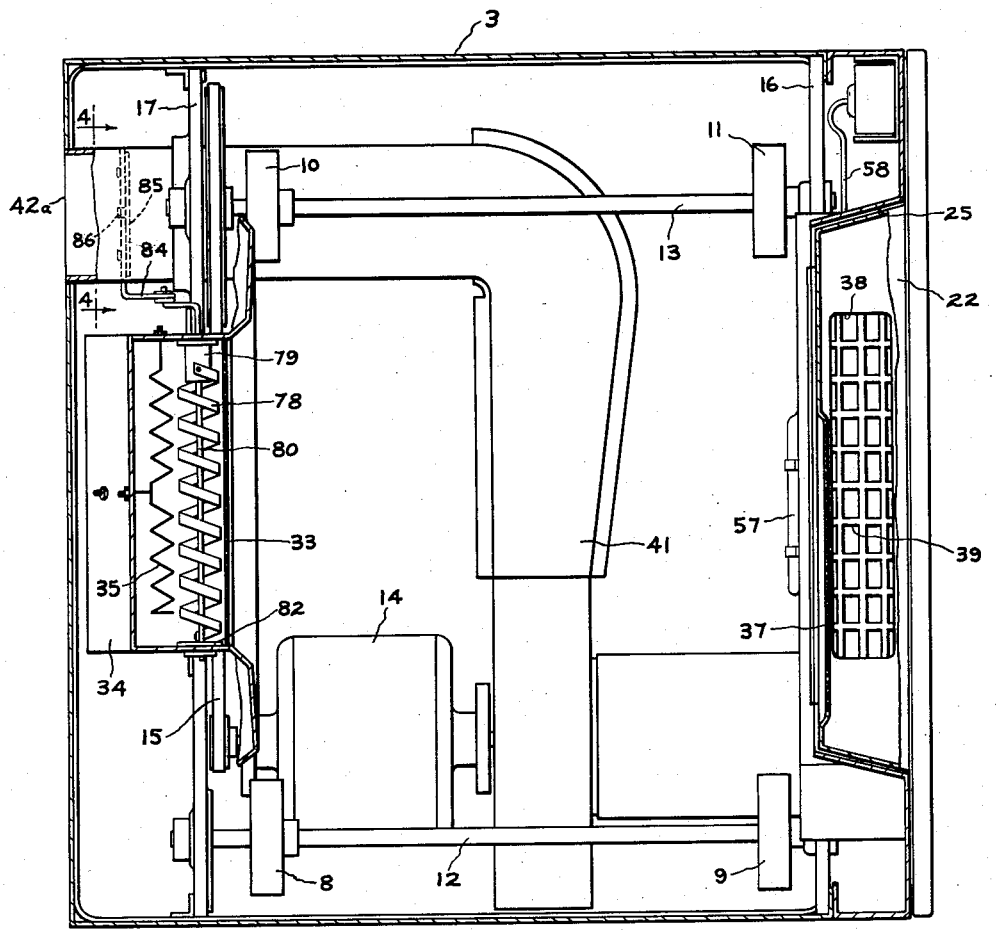
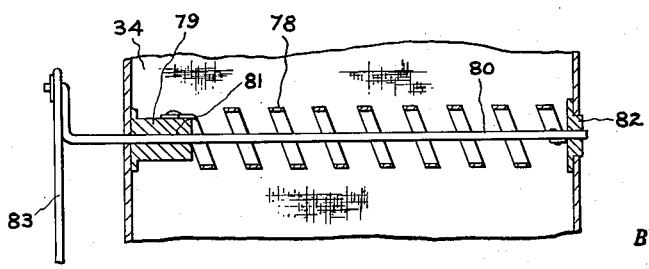

Feb. 7, 1961  P. G. HUGHES  2,970,383
AIR FLOW REGULATING SYSTEM FOR CLOTHES DRYERS
Filed March 24, 1958  3 Sheets-Sheet 3

INVENTOR.
PHILIP G. HUGHES
BY
HIS ATTORNEY

United States Patent Office

2,970,383
AIR FLOW REGULATING SYSTEM FOR CLOTHES DRYERS

Philip G. Hughes, Anchorage, Ky., assignor to General Electric Company, a corporation of New York Filed Mar. 24, 1958, Ser. No. 723,439

3 Claims. (Cl. 34—45)

This invention relates to clothes drying machines, and more particularly to an improved arrangement for maintaining constant the temperature of the heated air supplied to dry the clothes.

In domestic clothes drying machines, the drying function is achived by heating air and then causing it to pass through a suitable drum where the clothes to be dried are being tumbled so as to vaporize the moisture from the clothes. This may be done either by continually taking in fresh air and then, after it has been passed through the drum, exhausting it outside the machine cabinet, or else by using a closed cycle wherein after the air has passed through the drum it is dehumidified and reheated. In both of these commonly provided arrangements, quite substantial variations in the temperature of the air provided to the drum may occur unless means are provided to prevent them. For instance, where fresh air is continually taken in, the temperature of the drying air may be substantially influenced by the ambient temperature; where a closed cycle is provided, the temperature variations of the air provided to the drum can come about as a result of the air being cooled to a greater or lesser degree from being passed over the clothes.

Since there is usually a constant optimum air input temperature for any given drying cycle, it is desirable that variations in the air input temperature be kept to a minimum or eliminated. This is of particular importance, for instance, in automatic drying cycles such as, for instance, that described and claimed in my copending application Serial No. 650,789, filed April 4, 1957 (now Patent 2,878,580), on a Control System for Clothes Dryers, which application is also assigned to General Electric Company, the assignee of the present application. In the type of cycle therein disclosed, the amount of moisture retained by the clothes is measured by the temperature of the air after it has performed its drying function on the basis that the temperature will not rise substantially until the clothes are substantially dry on the surface, at which time vaporization will no longer be present to keep the temperature down. Clearly, in such a case, variations in the air input temperature may cause variations in the temperature of the air which has contacted the clothes which have nothing whatsoever to do with the dryness of the clothes.

It is therefore an object of this invention to provide an improved clothes dryer which will supply a substantially constant temperature of air to the clothes for drying purposes.

Another object of the invention is to achieve control of the air being supplied to the clothes by economical means which are automatically responsive to variations in the controlling conditions.

More specifically, a further object of the invention is to achieve the temperature regulation described above by varying the amount of flow of air over the heater and into the drum so that while variations in the volume of air per unit time will occur, the temperature of that air will be substantially constant. Variations in the volume have been found to have far less ill effect insofar as automatic drying cycles are concerned than variations in the air input temperature.

In carrying out the invention in one form thereof, I provide a clothes dryer which has the usual clothes tumbling means including a drum. In combination therewith, standard air circulating means are provided, including an inlet conduit to the drum, an outlet conduit from the drum, and suitable air moving means in one of the conduits to cause a flow of air from the inlet conduit through the drum to the outlet conduit. In the inlet conduit I provide means for heating the air before it reaches the drum.

To achieve a standard temperature of the air entering the drum, I provide by my invention thermostatic means for sensing the air temperature downstream of the heating means and upstream of the interior of the drum; the thermostatic means may, by way of example, be provided by a helically coiled bimetallic strip. In either the inlet or the outlet conduit, I provide flow regulating means which is connected to be controlled by the thermostatic means. The connection is arranged so that flow through the system is decreased in response to decreases in the temperature of the air entering the drum, and is increased in response to increases in the temperature of the air entering the drum. By this means, the temperature of the air introduced into contact with the clothes is maintained substantially constant; automatic drying systems which measure clothes dryness by the temperature of the air after it has contacted the clothes are thus subject only to the dryness of the clothes as a variable factor, and are not subjected to variations in the input temperature of the air.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawing.

In the drawing,

Fig. 2 is a horizontal sectional view of the dryer with the basket removed, and with certain surfaces broken away and partially sectionalized to illustrate further details;

Fig. 3 is a fragmentary sectional view of a thermostatic device provided to achieve the desired regulatory effect on the air flow in the dryer;

Figure 1:
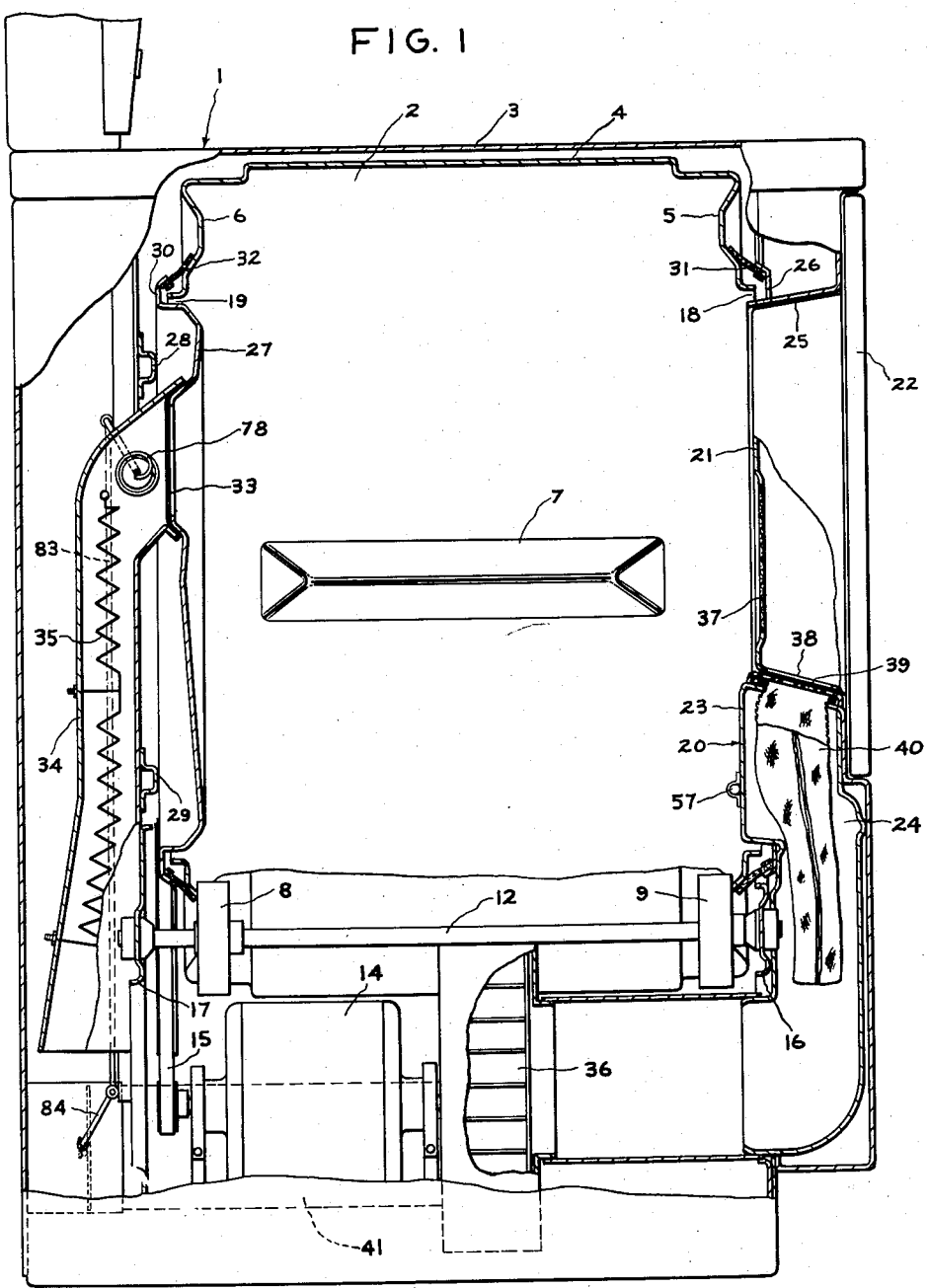
Fig. 1 is a side elevational view of a clothes dryer exemplary of those which may be provided with my improved air flow regulation system, the view being partially broken away and partially sectionalized to illustrate details of the dryer.

Referring now to Fig. 1, I have shown therein a domestic clothes dryer 1 which includes a rotatable open ended clothes tumbling basket 2 mounted for rotation about a horizontal axis and disposed within a suitable outer casing 3 which encloses it on all sides. The basket specifically comprises a cylindrical drum-like member having an outer cylindrical wall 4 and front and rear end walls 5 and 6. The outer cylindrical wall 4 is imperforate over its entire length and on its interior surface is provided with a plurality of clothes tumbling ribs such as 7.

The clothes basket is rotatably supported within casing 3 by means of a plurality of rollers 8, 9, 10 and 11 (see Fig. 2). Rollers 8 and 9 are mounted on a rotatable idler shaft 12 and rollers 10 and 11 are mounted on a power shaft 13. The idler shaft 12 has no driving connection, but the power shaft 13 is driven from the main drive motor 14 of the machine by means of a belt and pulley connection 15. As shown, both the drive shaft 13 and the idler shaft 12 are supported adjacent the front and rear of the dryer by means of suitable bearings mounted in front and rear support plates 16 and 17. Since it is freely supported on the roller wheels, basket 2 turns thereon whenever drive shaft 13 is driven by motor 14. The ratio of the drive and driven pulleys in the drive 15 is suitably chosen so that the basket is rotated at an appropriate speed to provide a clothes tumbling action for the articles of clothing placed therein.

In order that a stream of heated air may be passed to basket 2 to dry the clothes being tumbled therein, the basket is provided with suitable apertures in its front and rear walls. Specifically its front end wall 5 is provided with an aperture 18 and its rear end wall 6 is provided with a similar aperture 19. The front opening 18 is closed by means of a combination bulkhead, generally indicated at 20, which is formed of a number of adjacent members. Specifically, bulkhead 20 is formed of the inner surface 21 of access door 22 of the machine, a wall 23 of an outlet duct or conduit 24 leading from the basket, a door seat 25 for door 22, and an annular flange 26 mounted on the door seat and the wall of the duct 24. Annular flange 26 comprises the periphery of bulkhead 20 and surrounds opening 18 in the basket. The access door 22 when open provides for the insertion and removal of clothes from basket 2.

Rear opening 19 of the basket is likewise closed by a stationary bulkhead 27 which is supported from the dryer casing by a pair of cross supports 28 and 29. The outer edge of bulkhead 27 is defined by a flange 30 which surrounds opening 19. It will be noted that suitable air seals are provided at both the front and the rear of the basket to prevent air leakage: a sealing member 31 mounted on stationary flange 26 of the front bulkhead slidably engages basket wall 5 to prevent leakage through opening 18, and a similar sealing member 32 mounted on flange 30 of the rear bulkhead 27 engages the rear wall 6 to prevent leakage through opening 19. Sealing members 31 and 32, in addition to acting as air seals, also may act as thrust bearings for the basket 4, that is, by their resilience they may be arranged to hold the basket in its axial position on rollers 8, 9, 10 and 11. Such an arrangement does not form a part of my invention but is described and claimed in copending application Serial No. 650,598, filed on April 4, 1957 (now Patent 2,835,048) by Eugene G. Olthuis and Robert L. Dunkelman and assigned to the same assignee as the present invention.

In order to dry the clothes being tumbled within the basket, a stream of heated air is introduced into it through the rear bulkhead 27, is passed in a generally axial direction across the basket, and is then exhausted through the front bulkhead 20. The rear bulkhead 27 is provided with a screened air inlet opening 33; mounted behind bulkhead 27 and leading to inlet 33 as an air intake duct 34 which has positioned in it an electric heater 35. Duct 34 is open at its lower end, and during the operation of the machine air enters the machine cabinet through a suitably lowered air inlet opening (not shown), and passes upwardly through the duct to opening 33. As the air passes through the duct it is heated by the heater 35 and thus when it flows into the drum through opening 33 it is at a relatively elevated temperature suitable for drying the clothes.

The suction for drawing the air into the basket through intake duct 34 and opening 33 is created by suitable air moving means such as, for instance, a centrifugal blower 36 driven directly by drive motor 14. To provide the suction, the intake of blower 36 is connected to the front end of the basket by means of duct 24 and door 22. The door has a hollow interior, as shown, and it includes an opening 37 in its interior surface which communicates directly with the front end of the drum. Opening 37 is connected through the hollow interior of the door to a second opening 38 in the bottom of the door, and this opening in turn is connected to the upper end of the duct 24 through an aligned opening 39 in door seat 25. From opening 39 in the door seat, the duct 24 leads directly to the intake of the blower. With this arrangement, the blower applies the suction at opening 38 which draws air into the basket through the intake duct 34 and inlet 33. The air so entering the basket is drawn axially across the basket to the opening 38, and then passes downwardly through the door and the duct 24 to the blower. It will be noted that as the air enters the exhaust duct through the openings 38 and 39, it passes through a fine mesh lint trap 40 which is supported by the door seat and which is effective to remove any lint carried by the air.

From the blower, the air is exhausted from the machine through an outlet duct 41 which extends rearwardly to the back wall of the machine. The back wall is provided with a suitable aperture 42a to allow for the escape of the air from the machine.

It will be seen that duct 34 and opening 33 form conduit means for guiding air into the basket 2, and that opening 37, the hollow interior of door 22, openings 38 and 39, duct 24, blower 36, and duct 41 together form outlet conduit means from the drum through which the air passes after it has come into contact with the clothes to be dried.

In cooperation with the dryer construction set forth, suitable controls are provided for shutting the machine off at the proper time. These controls may, as shown, be of the type herein described wherein the dryness of the clothes, as reflected in the temperature of the air after it has passed over the clothes, is used as at least part of the criteria for determining when the dryer cycle should end.

Figure 6:
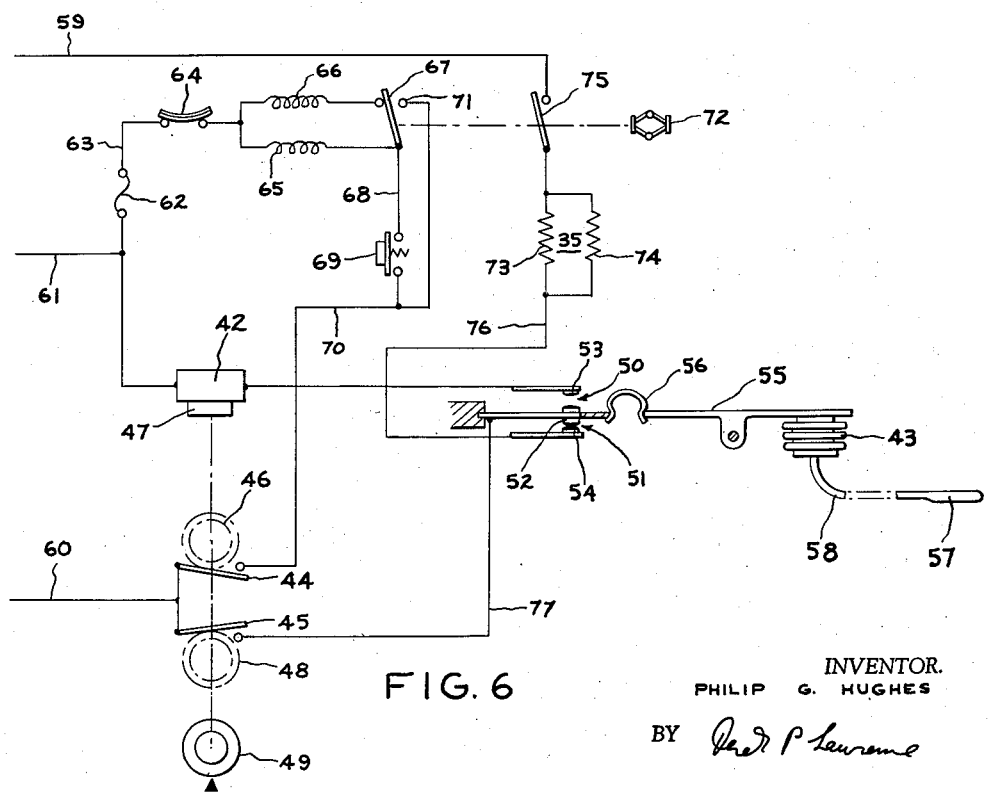
Fig. 6 is a schematic circuit diagram of a dryer control system of the type wherein the air flow regulatory function of the invention is of particular importance.

Such a regulation system is shown for example in the schematic diagram of Fig. 6. The system shown there includes two principal control means in the form of a timer motor 42 and a control thermostat 43. The timer motor, which is preferably of the synchronous type, is arranged to operate a pair of switches including a drive motor switch 44 and a combined timer motor and heater switch 45. Switch 44 is operated by a first cam 46 driven by the timer motor through suitable reduction gear means 47, and switch 45 is operated by a similarly driven second cam 48. The cams may be manually adjusted by an operator control dial 49 connected to the cam shaft and to the motor by a one-way clutch (not shown).

Control thermostat 43, like timer motor 42, operates a pair of switches. Specifically, it operates a timer motor switch 50 and a heater switch 51. Switches 50 and 51 share a common movable contact 52 which in its lower position closes switch 51 and in its upper position closes switch 50. For this purpose, switch 50 includes a stationary contact 53, and switch 51 includes a stationary contact 54. Thermostat 43, which is shown in its untripped or cold position, operates contact 52 through a pivoted link 55 engaged at its one end by thermostat 43 and at its other end by a toggle spring 56 which connects is operatively to the movable end of contact member 52. Spring 56 operates in the usual manner to move contact arm 52 between its upper and lower positions with a snap action as the adjacent end of arm 55 is moved.

Thermostat 43 may, as shown, be provided as an expansible hydraulic-fluid bellows element controlled through a sensing element 57 connected to it by a tube 58. The sensing element, or bulb 57, is positioned in a suitable location downstream of opening 33 so as to sense the temperature of air which has been in contact with the clothes and which therefore has a temperature substantially proportional and quite close to that of the clothes. This may be effected by positioning bulb 57, as shown in Fig. 1, on wall 23 where it is subjected both to the temperature of the air and clothes within the basket and, through wall 23, to the temperature of the air passing down through duct 24.

The entire control system is energized from a three-wire power supply having supply conductors 59 and 60 and a neutral conductor 61, for domestic use, conductors 59 and 60 will normally be connected across a 220 volt power supply, with 110 volts appearing between neutral line 61 and each of the conductors. Drive motor 14 of the machine is energized between neutral line 61 and supply conductor 60. Starting with neutral line 61 the circuit extends to the drive motor through a fusible cutout 62, a conductor 63, and a suitable motor overload protector 64. The motor will generally, as shown, include a main winding 65 and a start winding 66 which are connected in parallel through a motor operated centrifugal switch 67 when the machine is at standstill. From switch 67, the circuit extends through a conductor 68 to a normally open start switch 69 and is then completed back to supply conductor 60 through conductor 70 and switch 44.

Assuming switch 44 to be closed, the motor is started by the operator closing switch 69 to place line voltage across both windings 65 and 66. The motor starts to rotate, and as it comes up to speed centrifugal switch 67 is moved from its illustrated position to a second position where it opens the start winding and connects the main winding to contact 71. Switch 67 is operated by means of a suitable centrifugal mechanism 72 driven by motor 14. Contact 71 is directly connected to conductor 70 so that the operation of switch 67 disconnects the start winding 66 without de-energizing main winding 65, and the motor continues in operation on the main winding alone. The operator may now release switch 69, and the motor will continue running through its connection through contact 71 until such time as timer motor 42 operates switch 44.

When motor 14 comes up to speed, heater 35 is then energized across the supply conductors 59 and 60. Starting with conductor 59, the circuit extends to the two parallel resistors 73 and 74 of the heater through a switch 75 which is operated by centrifugal mechanism 72. Switch 75 is open when the motor is at rest and closes when the motor comes up to speed. The circuit is then continued through conductor 76, through contacts 54 and 52 (normally closed at the start of a drying operation), conductor 77 and switch 45 back to conductor 60. Thus, at the beginning of the drying operation, the heating element 35 is energized to heat the air being passed through the dryer drum.

The timer motor 42 is not energized at the beginning of the drying operation because switch 50 is open. It becomes energized only when the air temperature sensed by bulb 57 rises to a point sufficient to cause thermostat 43 to trip open switch 51 and close switch 50. This causes timer motor 42 to be energized through a circuit which, starting with neutral wire 61, passes through the timer motor to contact 53, contact 52, conductor 77, switch 45 and conductor 60. It will thus be seen that with switch 50 closed the timer motor is energized, with switch 51 closed the heater is energized, and that the closing of the two switches is alternative in nature.

In operation, when the exhaust temperatures sensed by bulb 57 causes switch 50 to be closed and switch 51 to be opened, the timer motor then begins to run and the heater 35 is shut off. The timer continues to run until the exhaust temperature falls low enough to cause switch 50 to open and switch 51 to close which stops the timer and starts the heater again. Thus, with a load of light synthetics to be dried the timer is set so that it runs for only a brief period and this will normally cause the drying operation to be terminated before thermostat 43 resets to its cold position the first time. The setting of the timer is effected by manual rotation of dial 49 which in turn causes a corresponding rotation of the cams 48. It will be understood that the greater the arc through which the dial 49 is rotated, the greater the length of time required for the timer motor to return the cams through that arc to their original position. For heavier fabrics, the length of time that the timer motor runs can be lengthened, by turning of dial 49 through an increased arc, so that two or more trips of the thermostat 43 will be provided for before the drying operation is terminated. This is desirable in the case of heavier and natural fabrics where, in addition to the moisture on the surface of the fabric which is evaporated during the first drying operation, moisture that has been within the fabric is brought to the surface and evaporated by subsequent operations of the heater.

The desired effect is obtained because the temperature of the exhaust air rises relatively little at first because most of the heat in the air is taken out in vaporizing the moisture in the clothes. However, as the amount of moisture being vaporized decreases, more heat is retained by the air, that is, the temperature of the air leaving the drum is higher. Thus, for a given input air temperature the exhaust air temperature provides a relatively reliable indication of the dryness of the clothes. However, this is true only to the extent that the temperature of the air entering the drum is constant since otherwise variations in the temperature of the air entering the drum will be reflected in the air leaving the drum. These variations will be sensed by thermostat bulb 57 which therefore will not provide a truly reliable indication of the dryness of the clothes unless some means for achieving a steady air input temperature is provided.

To achieve a steady temperature of the air provided to the interior of the drum in an economical manner, without requiring modifications to the electrical control system it is proposed to regulate the flow of air through the system in such a manner that a rise in the temperature of the air provided to the dryer will cause an increase in the amount of air passing through the drum, and a decrease in the temperature of the air entering the drum will cause a decrease in the amount of air being provided thereto. By varying the air flow with the temperature of the air entering the drum, the temperature can be kept within a relatively small range since a decrease in the amount of air permits the heater 35 to heat the air more to bring the temperature back up to the desired level, and an increase in the air flow correspondingly causes the air entering the drum to become cooler.

Figures 4, 5:
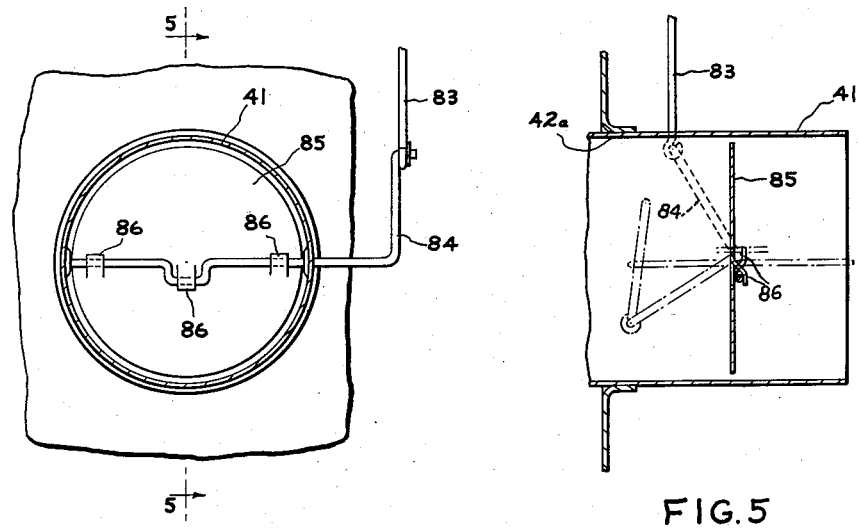
Fig. 4 is a view along line 4—4 in Fig. 2.
Fig. 5 is a view along line 5—5 in Fig. 4.

This goal is achieved by providing suitable temperature sensing means in the inlet conduit downstream of the heater 35 but upstream of the interior of the basket 2. In the present case, this is effected by securing a helically wound bimetallic strip 78 within duct 34 between the heater 35 and the opening 33 into drum 2. Referring to Fig. 3, the bimetallic strip 78 is secured at one end to a projection 79 extending from the wall of the duct 34 and at its other end is secured to a rod 80 which is journalled in an opening 81 in projection 79 and in a bearing member 82 provided on the opposite wall of duct 34. Rod 80 extends outside duct 34, as shown, and is pivotally linked to a rod 83 which extends downwardly into pivotal engagement with yet another rod 84 (Figs. 4 and 5). Rod 84 is rotatably secured on the walls of duct 41, and mounted within duct 41 on the rod so as to pivot therewith is a damper member 85 which has a diameter slightly smaller than that of duct 41. As shown, damper 85 may be secured to rod 84 by any suitable means such as by forming tabs 86 on the damper and securing them over the rod.

When bimetallic strip 78 is in its cold position it maintains damper 85 in an almost closed position so as to limit flow through duct 41 to a minimum; as the bimetallic strip heats up, it gradually deforms and causes rod 80 to turn which in turn pivots rods 83 and 84 to cause turning of damper 85 to permit more air to pass through duct 41. When the damper 85 assumes its horizontal position, as viewed in Fig. 5 and shown in phantom outline therein, it is permitting a maximum quantity of air to pass through the duct 41.

The operation of the regulatory system of the invention will be readily understood from the foregoing. When the dryer is started in operation and heater 35 has not yet had time to heat up, the quantity of air passed through duct 41 by blower 36 is kept at a minimum; as heater 35 heats up and becomes effective to heat a greater quantity of air, warmer air passing over the bimetallic strip 78 causes it to turn rod 80 and start to pivot damper 85 to a more open position. The bimetallic element 80 will thus tend to maintain a constant temperature of the air flowing into the drum by varying the position of the damper 85 in accordance with variations in the air flowing over the bimetallic strip. It will readily be apparent that this provides a known basis for the setting of bulb 57 of thermostat 43 so that the thermostat 57 responds to the condition of the clothes and is not unduly affected by other external factors such as the ambient temperature wattage drawn by the heater, etc.

It will be clear that the invention finds its prime importance in systems which depend on a clothes temperature sensing device such as thermostat bulb 57. While a particular system which also uses a timer has been used in the illustration of the invention, it will be clear that, by appropriate setting of the thermostat 43, the timer may be dispensed with entirely. In such a system, once the drying operation had been manually started, all operations would be terminated when the thermostat tripped. In such a system, proper regulation of the incoming air temperature would be equally as important as in the system described.

While in accordance with the patent statutes I have described what at present is considered to be the preferred embodiment of the invention, it will be obvious to those skilled in the art that various changes and modifications may be made therein without departing from the invention, and it is therefore aimed in the appended claims to cover all such equivalent variations as fall within the true spirit and scope of the invention.

What I claim as new and desire to secure by Letters Patent of the United States is:

1. A clothes dryer comprising clothes tumbling means including a drum; means for circulating a stream of air through said drum comprising inlet and outlet conduit means respectively communicating with said drum, and air moving means in one of said conduit means; means in said inlet conduit means for heating the air before it reaches said drum; control means comprising first thermostatic means downstream of the junction of said drum and said inlet conduit means for sensing an air temperature which varies with that of the clothes, and a timing mechanism, switch means controlled by said timing mechanism and said thermostatic means and arranged to control operation of said air heating means and said air moving means, said thermostatic means and said timing mechanism being arranged in cooperative relation to cause said switch means to shut off said air heating means and said air moving means after the clothes in said dryer are substantially dry as indicated by a rise in the air temperature sensed by said thermostatic means; second thermostatic means for sensing air temperature downstream of said heating means and upstream of the interior of said drum; flow regulating means positioned in one of said inlet and outlet conduit means; and means connecting said second thermostatic means to control said flow regulating means, said second thermostatic means causing said flow regulating means to decrease flow in response to decreases in the temperature sensed by said second thermostatic means and to increase flow in response to increases in the temperature sensed by said second thermostatic means so as to maintain substantially constant the temperature of the air introduced into said drum whereby variations in the temperature sensed by said first thermostatic means reflect only changes in the rate of vaporization of moisture from the clothes in said drum.

2. A clothes dryer comprising a clothes tumbling means including a drum; means for circulating a stream of air through said drum comprising inlet and outlet conduit means respectively communicating with said drum, and a blower positioned in said outlet conduit means to move air from said inlet conduit means through said drum and out through said outlet conduit means; a heater positioned in said inlet conduit means for heating the air before it reaches said drum; control means comprising first thermostatic means downstream of the junction of said drum and said inlet conduit means for sensing an air temperature which varies with that of the clothes being dried in said drum, and a timing mechanism, switch means controlled by said timing mechanism and said thermostatic means and arranged to control operation of said blower and said heater, said thermostatic means and said timing mechanism being arranged in cooperative relation to cause said switch means to shut off said blower and said heater after the clothes in said dryer are substantially dry as indicated by a predetermined rise in the temperature sensed by said thermostatic means; a bimetallic strip for sensing air temperature downstream of said heater and upstream of the interior of said drum; a damper pivotably positioned in said outlet conduit means; and a linkage connecting said bimetallic strip to said damper, said bimetallic strip controlling said damper through said linkage to cause it to pivot toward a closed position to decrease flow in response to a decrease in the temperature of the air passing over said strip and to pivot toward an open position to increase flow in response to an increase in the temperature of the air passing over said strip so as to maintain substantially constant the temperature of the air introduced into said drum whereby variations in the temperature sensed by said first thermostatic means accurately reflect variations in the condition of dryness of the clothes in said drum.

3. A clothes dryer comprising clothes tumbling means including a drum; means for circulating a stream of air through said drum comprising inlet and outlet conduit means communicating respectively with said drum, and air moving means in one of said conduit means; means in said inlet conduit for heating the air before it reaches said drum; control means comprising first thermostatic means downstream of the junction of said drum and said inlet conduit means for sensing an air temperature which varies with that of the clothes, switch means controlled by said thermostatic means and arranged to control operation of said air moving means and of said heating means, said control means being arranged to cause said switch means to shut off said air moving means and said heating means after the clothes in said dryer are substantially dry as indicated by a rise in the air temperature sensed by said thermostatic means; second thermostatic means for sensing air temperature downstream of said heating means and upstream of the interior of said drum; flow regulating means positioned in one of said inlet and outlet conduit means; and means connecting said second thermostatic means to control said flow regulating means, said second thermostatic means causing said flow regulating means to decrease flow in response to decreases in the temperature sensed by said second thermostatic means and to increase flow in response to increases in the temperature sensed by said second thermostatic means so as to maintain substantially constant the temperature of the air introduced into said drum whereby variations in the temperature sensed by said first thermostatic means reflect only changes in the rate of vaporization of moisture from the clothes in said drum.

References Cited in the file of this patent
UNITED STATES PATENTS

| | | |
|---|---|---|
| 2,216,873 | Browne | Oct. 8, 1940 |
| 2,562,405 | Altman | July 31, 1951 |
| 2,569,515 | Collins | Oct. 2, 1951 |
| 2,654,961 | Manecke | Oct. 13, 1953 |
| 2,780,008 | Stickel | Feb. 5, 1957 |